US012521648B2

(12) United States Patent
Davis

(10) Patent No.: US 12,521,648 B2
(45) Date of Patent: Jan. 13, 2026

(54) SEPARATION APPARATUS, SYSTEM AND METHOD OF USE

(71) Applicant: Ross Davis, Houston, TX (US)

(72) Inventor: Ross Davis, Houston, TX (US)

( * ) Notice: Subject to any disclaimer, the term of this patent is extended or adjusted under 35 U.S.C. 154(b) by 581 days.

(21) Appl. No.: 17/947,468

(22) Filed: Sep. 19, 2022

(65) Prior Publication Data

US 2023/0014402 A1 Jan. 19, 2023

Related U.S. Application Data

(63) Continuation-in-part of application No. 17/344,891, filed on Jun. 10, 2021, now Pat. No. 11,478,729.

(60) Provisional application No. 63/141,779, filed on Jan. 26, 2021.

(51) Int. Cl.
*B01D 17/04* (2006.01)
*B01D 17/02* (2006.01)
*B01D 21/24* (2006.01)
*C02F 1/40* (2023.01)
*C02F 103/10* (2006.01)

(52) U.S. Cl.
CPC ....... *B01D 17/041* (2013.01); *B01D 17/0214* (2013.01); *B01D 21/2444* (2013.01); *C02F 1/40* (2013.01); *C02F 2103/10* (2013.01)

(58) Field of Classification Search
CPC .............. B01D 17/041; B01D 17/0214; B01D 21/2444; C02F 1/40; C02F 2103/10
See application file for complete search history.

(56) References Cited

U.S. PATENT DOCUMENTS

| | | | | |
|---|---|---|---|---|
| 2,330,508 A | * | 9/1943 | Mccoll | B01D 17/0208 210/523 |
| 3,688,909 A | * | 9/1972 | Titus | E02B 15/106 210/923 |
| 3,727,765 A | * | 4/1973 | Henning, Jr. | E02B 15/10 210/776 |
| 3,966,614 A | * | 6/1976 | Ayers | E02B 15/048 210/776 |
| 4,695,376 A | * | 9/1987 | Astrom | B01D 21/0027 210/523 |
| 4,867,872 A | * | 9/1989 | Russell | G01F 23/0038 210/776 |
| 5,772,871 A | * | 6/1998 | Lyon | B01D 17/12 210/DIG. 5 |
| 6,905,611 B2 | * | 6/2005 | Gustafsson | B01D 17/0214 210/776 |
| 10,808,370 B1 | * | 10/2020 | Campbell | E02B 15/106 |

(Continued)

*Primary Examiner* — Liam Royce

(57) ABSTRACT

A skimmer apparatus is provided to separate a less dense upper liquid layer from on top of a denser lower liquid layer. The skimmer apparatus includes a skimmer vessel at least partially submerged within a fluid and preferentially receive the less dense fluid. A first conduit is located within the skimmer vessel by a plurality of support arms. The plurality of support arms affixes the first conduit's vertical and radial location within skimmer vessel. In use, the skimmer height is set to collect the less dense fluid into the skimmer vessel. A lower end of the first conduit is in fluid communication with the inside of the skimmer vessel and the collected fluid therein. An upper end of the first conduit is configured for being suctioned thereby withdrawing fluid from the skimmer vessel.

12 Claims, 13 Drawing Sheets

(56) References Cited

U.S. PATENT DOCUMENTS

2004/0168967 A1* 9/2004 Thompson .......... B03D 1/1412
                                                  210/744
2014/0190517 A1* 7/2014 Fallon ................ B08B 9/0933
                                                  134/169 R

* cited by examiner

SEPARATION APPARATUS, SYSTEM AND METHOD OF USE

CROSS REFERENCE TO RELATED APPLICATIONS

This application is a continuation-in-part from pending U.S. patent application Ser. No. 17/344,891 entitled "Separation Apparatus, System and Method of Use" filed Jun. 10, 2021, which claims priority and benefit from U.S. Provisional Patent Application No. 63/141,779 filed on Jan. 26, 2021, for "Fluid Skimmer Device, System and Method," the contents of which are incorporated in their entirety herein by reference.

TECHNICAL FIELD

Systems, devices and methods for skimming and recovery of a less dense fluid floating over a denser fluid by applying a skimming container in contact with the fluid volume are disclosed.

BACKGROUND

Production operations in the oil and gas industry refers to the stage at which the hydrocarbons are drawn from the subsurface. Once at the surface, the hydrocarbon material is transferred, treated, and stored at the well site location or other field installation for future transport to a refinery or pumping station.

Many oil fields produce at certain times a multiphase fluid which may be a mix of saltwater and oil which needs to be separated and disposed of properly to avoid surface and groundwater contamination. The fluid is generally collected at a central station that includes one or more saltwater tanks. After which, the saltwater may be picked up and transported to another location for disposal, which typically is a well specifically designed to accept saltwater waste fluids. Alternatively, the saltwater fluid produced at the field level may be directly connected to a saltwater disposal well located onsite. In this case, the saltwater is typically transferred via a pipeline or gathering lines running from the saltwater tanks to the disposal well and the waste saltwater is then pumped into a subterranean formation permitted for that purpose.

Some amount of oil may accumulate and may need to be removed from within tanks designated for saltwater storage because contaminants in the saltwater fluids is deleterious to the permeability of the injection zone into which the waste saltwater flows. Contaminants could include organic material, precipitated solids, oil, and/or oil by-products. Thus, the removal of oil from the saltwater stored in the saltwater tanks is important so that no oil is injected into the formation which could reduce the injection zone's capacity in the saltwater disposal well.

Further, contaminants and precipitates formed in the oil can cause damage to injector pumps and related equipment used for saltwater disposal purposes. Damage to the equipment and reduced saltwater well injection capacity from oil and other oil contaminants pumped into a disposal well results in higher cost of production for oil and gas operators. In addition, waste saltwater can be produced in such large volumes that storage capacity is becomes a limiting factor; the contaminant oil takes up valuable volume and adds to costs. Also, malfunctions of equipment and sensors can result in spills and spillovers of liquids stored in saltwater tanks that include oil. These spills then require cleanup at the tank secondary containment area, commonly referred to as the "firewall," or other areas outside the containment area. In certain states, spills over a certain amount must be reported to the applicable regulatory agency which could result in fines and other penalties.

Currently, if saltwater in a storage tank is contaminated with an oil layer, or an oil-water mix is spilled into a containment or other area, specialized personnel and vacuum trucks are required to remove and dispose the contaminated fluid from the tank, firewall or other area. This is a costly and time-consuming process. Therefore, there is a need for an apparatus and method to economically remove oil that accumulates in the upper level of tanks intended to store waste saltwater, as well as from containment and other areas in the event of a spill.

SUMMARY

There is provided a skimmer apparatus for removing a volume of less dense fluid from the top of a denser volume of fluid. An exemplary embodiment of the skimmer apparatus includes a skimmer vessel that has a closed bottom (125) and an open top to receive fluid into the skimmer vessel. The skimmer vessel is configured to contain a fluid. The exemplary apparatus also includes a first conduit, located within the skimmer vessel, and in fluid communication with an inside of the skimmer vessel. An upper end of the first conduit is configured for withdrawing fluid from the skimmer vessel. There is a plurality of support arms, each extending from an inner wall of the skimmer vessel to an outer wall of first conduit. The plurality of support arms affixes the first conduit's vertical and radial location within skimmer vessel.

In one embodiment, the plurality of support arms may be vertically adjustable within the main body.

In another embodiment, the plurality of support arms each may have an end slidable in a slot attached to in an inner wall of the skimmer vessel.

Further, in another embodiment, the upper end of the first conduit may be configured to couple, to a threaded nipple, a check valve, a second threaded nipple, and a camlock.

In addition, in an embodiment, the upper end of the first conduit may be configured to couple in a fluid-tight fitting to a second conduit such that the second conduit can withdraw fluid from the skimmer vessel via the first conduit.

In yet another exemplary embodiment, the skimmer may include a series of inflatable floats arrayed around the skimmer. The floats may be in fluid communication with a gas distribution ring supplying gas to each float to inflate the float so that they provide buoyancy to the skimmer when it is deployed in a fluid for skimming operations. Other arms, inflatable and/or non-inflatable, may be attached to the skimmer vessel to aid in guiding the less dense material into the vessel.

In yet another embodiment, the skimmer may include a vertical depth indicator.

In another aspect, there is also provided an exemplary embodiment of an adjustable height skimmer assembly configured for removing a volume of less dense fluid from the top of a denser volume of fluid. An exemplary embodiment includes a skimmer vessel configured to be partially immersed in the volume of fluid to thereby contain a portion of the less dense fluid. The skimmer vessel includes a closed bottom and an open top for receiving the less dense fluid. It also contains a first fluid conduit (located within the skimmer vessel) and configured for fluid communication with a second conduit. Also included is a skimmer vessel height adjustment assembly. This assembly has a platform configured for the skimmer vessel to seat thereon; and a base plate supporting the platform. The platform is vertically adjustable mechanically relative to the base plate to raise or lower the skimmer seated thereon. Thus, when in use, a height of the skimmer vessel within the volume of fluid is adjustable by raising or lowering the platform.

In one exemplary embodiment, the skimmer assembly may include a vertical crank rod mechanically coupled to the base platform; a movable vertical member mechanically coupled to the crank rod, and wherein actuation of the crank rod movably adjusts the platform and the skimmer vessel up or down within the fluid.

In a further exemplary embodiment, a vertical member may be mechanically coupled to the crank rod such that the vertical member ratchets up or down as the crank rod is actuated, thereby, during use, moving the platform (and the skimmer vessel seated thereon) up or down in the fluid.

In an exemplary embodiment, the skimmer vessel may further include a plurality of support arms, each arm extending from an inner wall of the skimmer vessel to an outer wall of first conduit. Thus, the plurality of support arms affixes the first conduit's vertical and radial location within skimmer vessel. The plurality of support arms may each have an end slidable in a slot in the inner wall of the skimmer vessel to facilitate slidingly moving the arm up and down in the slot.

In an additional aspect, there is provided a method of separating from each other a volume of a less dense fluid lying atop a second volume of a denser fluid in a contained space. This exemplary method includes at least the steps of providing a skimmer vessel configured to be partially immersed in a volume of fluid and to contain at least some fluid; adjusting a height of the skimmer vessel in the contained space to permit substantially only less dense fluid to enter the interior of the skimmer vessel, while substantially excluding entry of more dense fluid into the skimmer vessel; and withdrawing the less dense fluid from the interior of the skimmer vessel.

In another exemplary embodiment, the step of providing a skimmer vessel may include providing a skimmer vessel having a closed bottom and a top open to receive fluid into the skimmer vessel, the skimmer vessel configured to contain a fluid. Further it includes providing the skimmer with a first fluid conduit located within the skimmer vessel that is in fluid communication with an inside of the skimmer vessel. The first conduit may have an upper end configured for withdrawing fluid from the skimmer vessel. In addition, there may be a plurality of radially extending support arms each extending from an inner wall of the skimmer vessel to an outer wall of first conduit, wherein the plurality of support arms affixes the first conduit's vertical and radial location within skimmer vessel.

In the foregoing or another embodiment, the step of providing a skimmer vessel may include providing a skimmer vessel with a height adjustment assembly that has a platform configured for the skimmer vessel to seat thereon; and a base plate supporting the platform. Thus, the platform is vertically adjustable mechanically relative to the base plate by the step of adjusting the height, which includes raising or lowering the platform.

In an exemplary embodiment, the step of adjusting may include moving a crank rod, the moving causing an adjustment of the height of the skimmer vessel in the contained space.

In an exemplary embodiment, the contained space is a storage tank, and the step of withdrawing includes pumping out less dense fluid from the skimmer vessel under pump suction pressure.

In another embodiment, A skimmer assembly for removing a volume of less dense fluid from the top of a denser volume of fluid, the assembly comprises a skimmer vessel configured to be partially immersed in the volume of fluid and contain a portion of the less dense fluid, the skimmer vessel having a cylindrical main body with a closed bottom and an open top for receiving the less dense fluid, a first fluid conduit located within the main body and configured for fluid communication with a second conduit. The skimmer vessel also includes a skimmer vessel height adjustment assembly with a lift shaft member in mechanical communication with the skimmer vessel wherein actuation of the height adjustment assembly adjusts the skimmer vessel vertical position within the fluid and the skimmer vessel also includes two or more wheels coupled to the skimmer assembly and a transporting handle to aid in mobility of the assembly.

In another exemplary embodiment, a skimmer assembly and method for removing a volume of less dense fluid from the top of a denser volume of fluid is disclosed with includes a skimmer vessel configured to be partially immersed in the volume of fluid and contain a portion of the less dense fluid. The skimmer vessel includes a cylindrical main body with a closed bottom and an open top for receiving the less dense fluid, a first fluid conduit located within the main body; the first fluid conduit configured for fluid communication with a second conduit, and a skimmer vessel height adjustment assembly comprising a circular base plate member configured to receive a lift shaft member coupled to a movable vertical member wherein said movable vertical member is coupled to the skimmer vessel, and wherein actuation of the height adjustment assembly adjusts the skimmer vessel vertical position within the fluid.

BRIEF DESCRIPTION OF THE DRAWINGS

The accompanying not-to-scale drawings, which are incorporated in and constitute a part of the specification, illustrate schematically one or more embodiments and, together with the description, explain these embodiments. In the drawings.

DETAILED DESCRIPTION

The following detailed description of exemplary embodiments refers to the accompanying drawings. The term "exemplary apparatus" means "an example of an apparatus." The same reference numbers in different drawings identify the same or similar elements. The detailed description does not limit the scope of the invention, which is set forth in the claims appended hereto, but is intended to provide exemplary description of devices, systems and methods. The exemplary embodiments are discussed, for simplicity, with regard to devices, systems and methods to remove a low-density fluid, typically oil, from atop a higher density fluid which typically may be water. However, the embodiments discussed herein are not limited to such elements. The terms substantially as used herein, for example as in "substantially only less dense fluid" flowing into the skimmer vessel means about 80 to 90% or more of less dense fluid, as opposed to more dense fluid.

Reference throughout the specification to "one embodiment" or "an embodiment" means that a particular feature, structure or characteristic described in connection with an embodiment is included in at least one exemplary embodiment of the subject matter disclosed. Thus, the appearance of the phrases "in one embodiment" or "in an embodiment" in various places throughout the specification is not necessarily referring to the same embodiment. Further, the described features, structures or characteristics may be combined in any suitable manner in one or more embodiments.

Figure 1A:
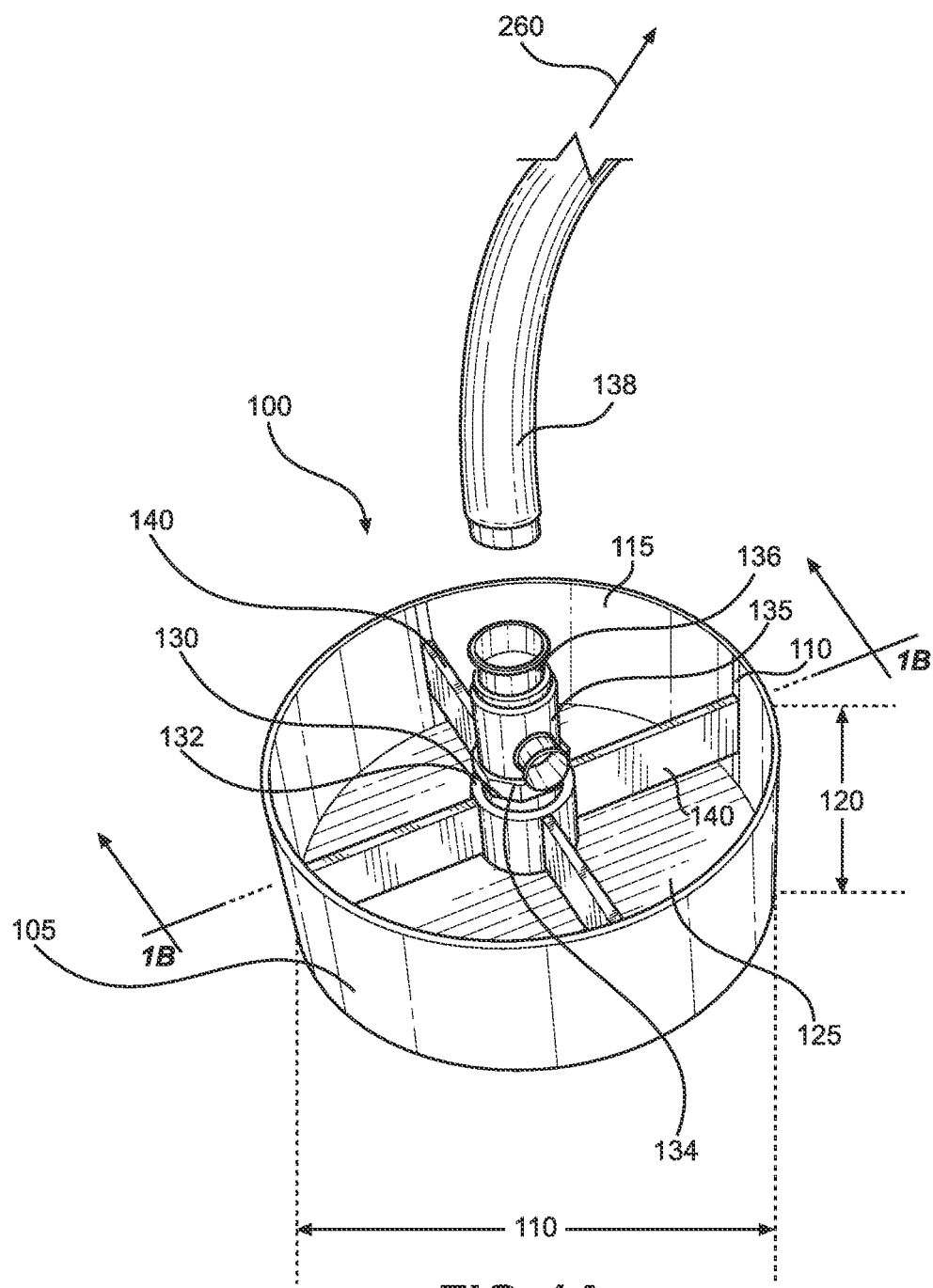
FIG. 1A illustrates an exemplary embodiment of the separation apparatus.

An exemplary apparatus and system for removing a less dense volume of fluid from on top of a denser volume of fluid contained within a tank or other reservoir or area is shown in FIG. 1A. In this exemplary embodiment, the skimmer vessel 100 is comprised of a cylindrically shaped main body 105 comprised of a shell of a scalable diameter 110 and height 120 with a closed bottom 125 and open top. For example, an easily portable unit may be 6 inches in diameter and 12 inches in height, though other sizes are readily contemplated and scaled depending on the application such as tank size. For purposes of this disclosure, the skimmer vessel 100 will be referred to herein simply as "the vessel, skim vessel or skimmer vessel," but may interchangeably be referred to as a "basket", "bucket", "cylinder", "skimmer", "skim bucket" or "skimmer bucket", "weir" or other similar term, as commonly used in the field of separator devices.

In general, two or more radial support arms 140 in the vessel may intersect to fix a first conduit 130's position within the center of main body 105. For example, in the embodiment as shown in FIG. 1A, four support arms 140 are shown and are each comprised of steel or other metal alloy extending radially inward from one point on an inner wall 115 to an outer wall central first conduit 130. The arms 140 may be welded to the inner wall 115 of main body 105 which itself may be steel or the same or similar alloy as the support arms 140. Connection of support arms 140 to an outer wall of first conduit 130 is typically by weld. In other embodiments the vessel may be made of plastic or other composite material to reduce weight and molded as a single unit or more than one piece to be fitted together. Regardless of construction material, support arms 140 may be attached to main body 105 and first conduit 130 by means other than welding, for example, with screws or other type mechanical connections such as J-locks, threads, pins, snap fits or other means. In a yet further exemplary embodiment, the inner wall 115 may include slots 110 as shown in FIG. 1A. In other embodiments, main body 105 inner wall 115 may include fins that are slotted, and which can receive ends of the support arms 140 affixed to the slotted fins with wing nuts or other connectors. This allows raising or lowering the support arms 140 and first conduit 130 within the main body 105.

As shown in FIGS. 1A and B, first conduit 130 is positioned within the interior of main body 105 by radial support arms 140. Conduit 130 may be comprised of a cylindrical body with a through passageway for flow of material, for example, as a short section of pipe or a ring with threads capable of further connection to another component, or a "stack" of connected components to be discussed below. In preferred embodiments, support arms 140 and first conduit 130 are fixed at a predetermined height within main body 105. In one non-limiting example, first conduit 130 may be radially centered and fixedly positioned vertically such that the bottom end of first conduit 130 is located at 5 inches from the top (or 1.5 inches from the bottom) of main body 105 with a height of 6.5 inches. However, as discussed, support arms 140 may be raised or lowered to provide for height adjustability of first conduit 130 positioned with main body 105.

Figure 1B:
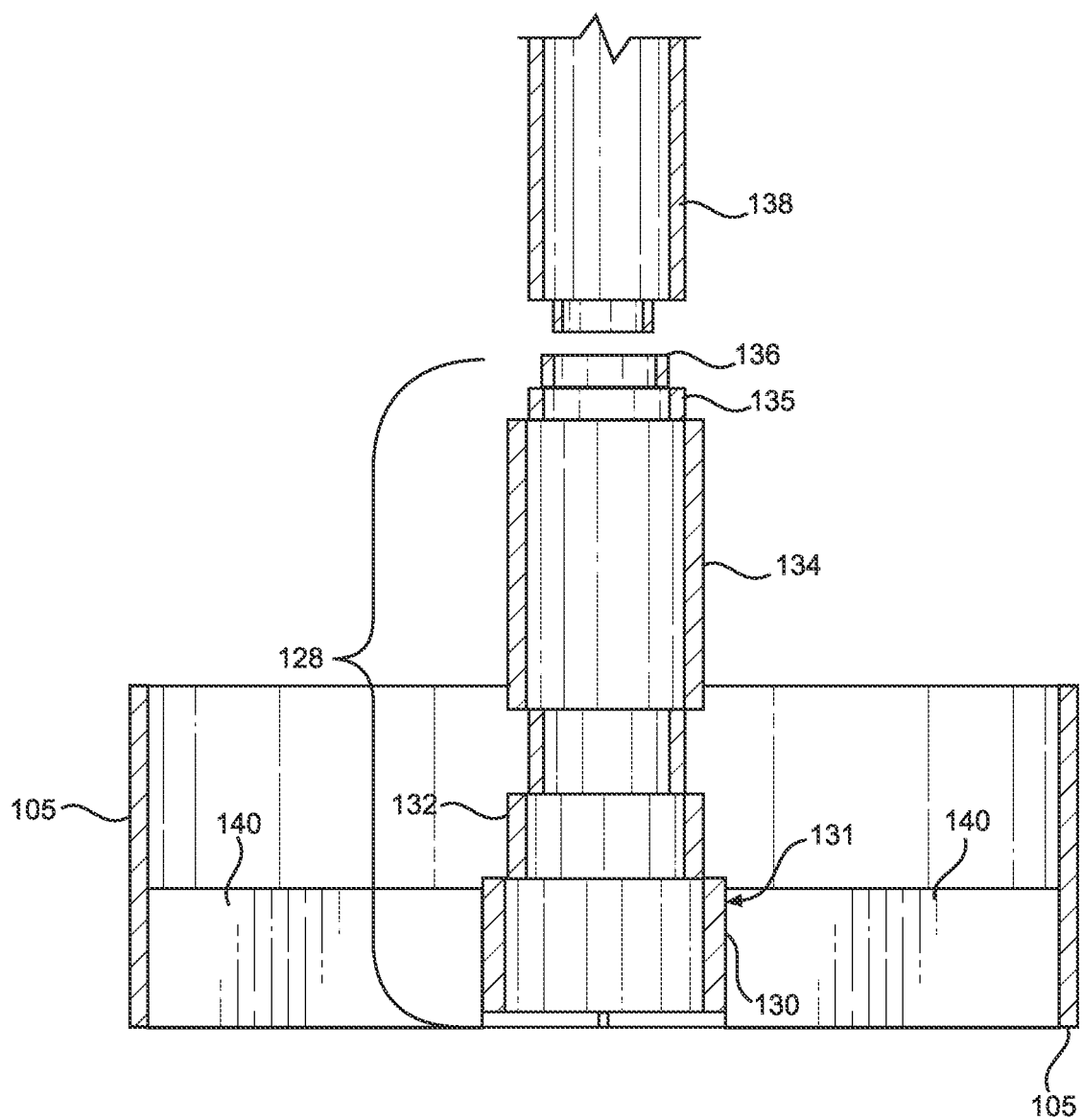
FIG. 1B is a cross-sectional view of the apparatus of FIG. 1A.

Referring to FIG. 1B, a connection stack 128 may typically be included as part of the apparatus for connecting skimmer vessel 100's first conduit 130 to a hose or second conduit 138. First conduit's 130 upper end may, for example, include an upper threaded end for mechanical coupling, or a threaded nipple or other threaded or snap connecting type fitting, e.g., a quick connect fitting to provide connection to one or more additional components. For example, as shown in the apparatus of FIG. 1B, threaded nipple 132 is connected via female threads to the upper mechanical coupling 131 male threads located on the upper end of first conduit 130. A check valve 134 is then attached, then a third threaded nipple 135, followed by cam lock 136, all of which are provided as a connection stack 128 to affect connection to second conduit 138, which in this example is in the form of a flexible inlet hose. Second conduit 138 is then connected to a distant cam lock (not shown) or other connector for eventual connection to a pump 260 as shown in FIG. 2.

Embodiments for a portable, manually operated skimmer vessel apparatus and system may comprise a skimmer vessel 100, with a connection stack 128, connectable to second conduit 138, which may be a flexible tubular hose. In yet other embodiments, the flexible hose may be exchanged for rigid conduit for a statically installed system. Additionally, an inline or canister site glass may also be disposed at a distal position along hose 138's length to allow the operator to view the fluid moving through the conduit. Other flow control components may be included inline as part of the above-described exemplary system, e.g., one or more other check valves, manually or electrically actuated ball, gate or other cutoff valves, flow or pressure sensors or meters, debris traps, a venturi or settling chamber, filters or the like may be included. Further, elbows of varying angle (e.g., 45, 90 degrees), a "T" joint, or other sections of pipe or line may be included as part of the second conduit or connection stack to provide for better angular control of skimmer vessel 100 or for handling, routing or diversion of the fluid withdrawn from skimmer vessel 100. Also, a section of pipe connected to the skimmer vessel 100 may be rigid to accommodate a handle so that an operator can hold and manipulate the apparatus manually. Additionally, skimmer vessel 100 may include a removable debris screen (not shown) comprised of a mesh of any porosity that is installed within main body 105, or alternatively substantially covers or surrounds main body 105 such that it serves to hinder unwanted larger solids and debris entering into the vessel and potentially getting drawn into first conduit 130.

Figure 2:
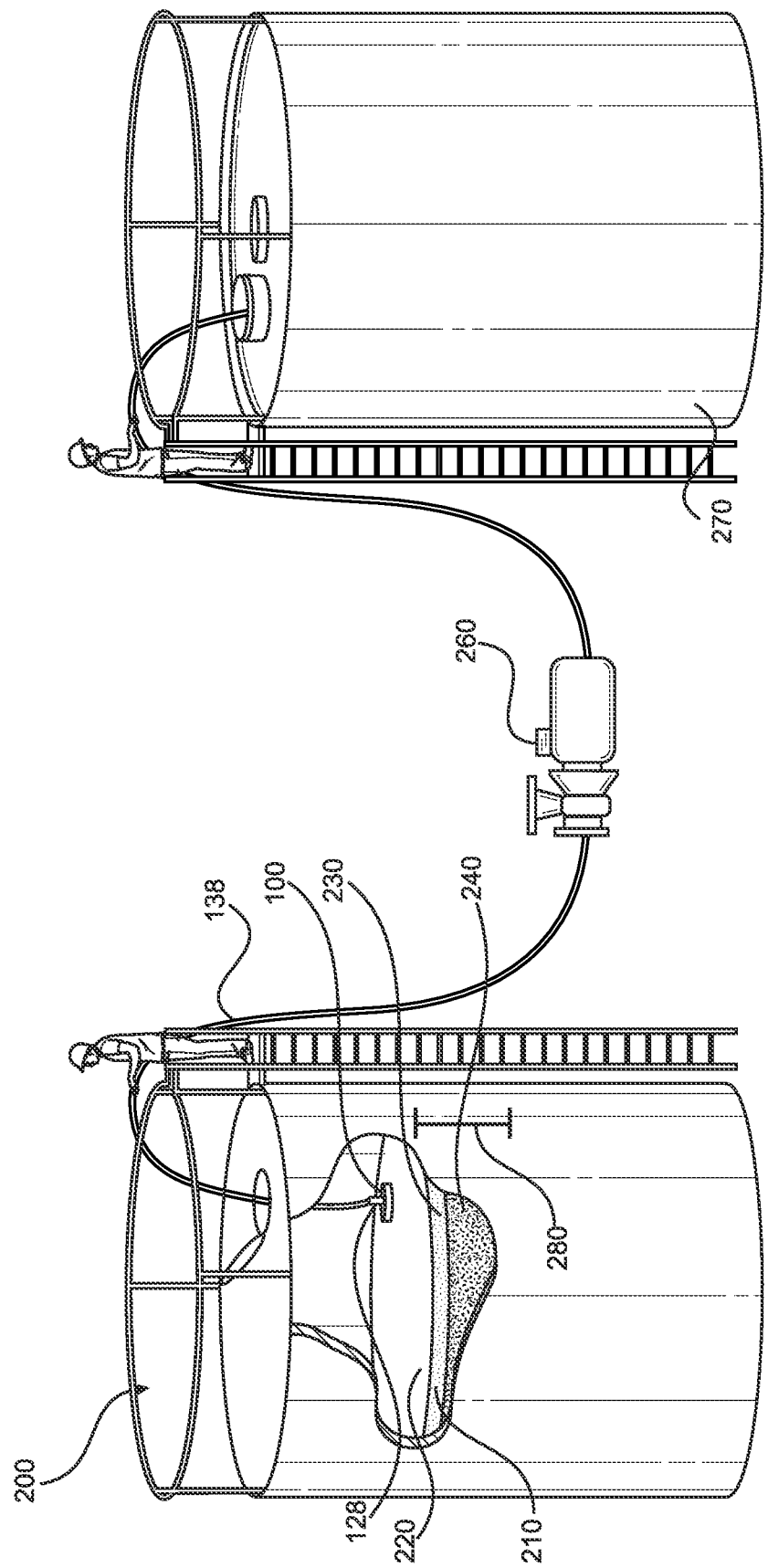
FIG. 2 illustrates an exemplary embodiment of the separation apparatus in use.

In portable, manually operated embodiments, as shown in FIG. 2, skimmer vessel 100 is lowered by an operator into a tank 200 or other fluid containing reservoir to a height 210. At this height, the top of the skimmer vessel 100 should be below the air fluid interface 220 of the lower density fluid 230 (which lies atop the higher density fluid 240). As a result, the lower density fluid 230 flows into vessel 100 filling it to a level that reaches at least the bottom of first conduit 130.

The less dense fluid 230 that has flowed over the top of the main body 105 of skimmer vessel 100 accumulates in main body 105 as a substantially single phase (e.g., oil) volume of fluid. Once the volume of fluid within main body 105 reaches at least the bottom of first conduit 130, the suctioning power of the pump 260 then withdraws the less dense fluid via first conduit 130 in main body 105 and then via second conduit inlet hose 138 to a or mobile (e.g., truck based) tank 270 or a static container tank 270 (as shown) for further handling or transport.

Methods of operation include steps of providing skimmer vessel 100 with a second conduit 138 connected to pump 260. Vessel 100 is positioned at a typically shallow fixed vertical position 210 within tank 200 such that the top of main body 105 is maintained preferably just below the upper surface of the less dense layer 230. The vertical position is adjusted as the less dense fluid flows into the main body 105 which is continuously withdrawn from main body 105 which allows for preferential removal of the less dense layer 230 such that the vessel is never emptied of fluid until the less dense layer is substantially fully removed from on top of the denser layer 240. Once in operation, the negative pressure from vacuum pump 260 also draws the less dense layer 230 over the top of the main body 105.

In this embodiment, positioning of the skimmer vessel 100 is accomplished manually by an operator holding the hose 138 (or a handle connected to it) and continuously adjusting the positioning of the skimmer vessel in response to falling fluid levels within tank 200. The operator adjusts the position of the skimmer vessel by looking down into the tank as well as monitoring an optional site glass 280.

Figure 3:
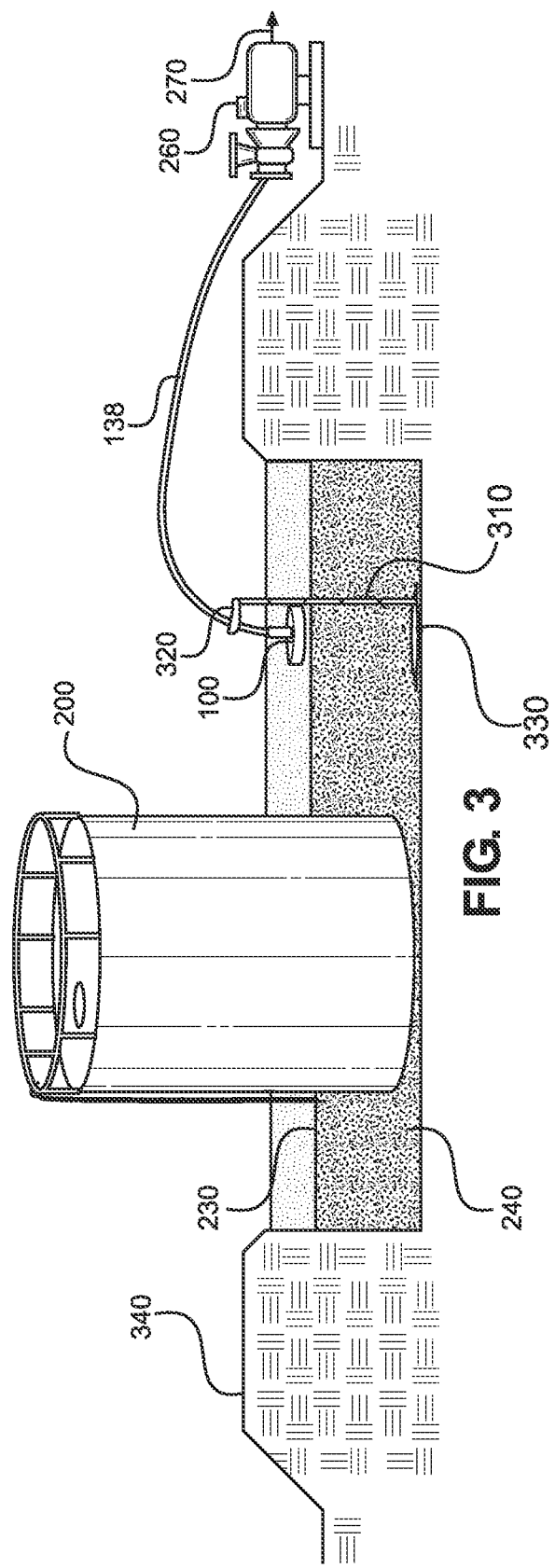
FIG. 3 illustrates an exemplary embodiment of a separation system.

In the above exemplary embodiments, a portable, manually deployed apparatus, system and method are described. In other embodiments, particularly within a tank's secondary containment region 340 (i.e., the "firewall") intended to contain a spill or overflow of fluid; a statically positioned skimmer vessel assembly and system may be deployed as shown in exemplary FIG. 3. In this embodiment, skimmer vessel 100 may be coupled to a manually operated or powered (i.e., motor-driven, pneumatically, or hydraulically) adjustable height mechanism 300 (discussed below in more detail). In FIG. 3 the skimmer vessel is deployed into a containment area 340 (commonly referred to as a "firewall" area) surrounding a tank 200.

Figure 4A:
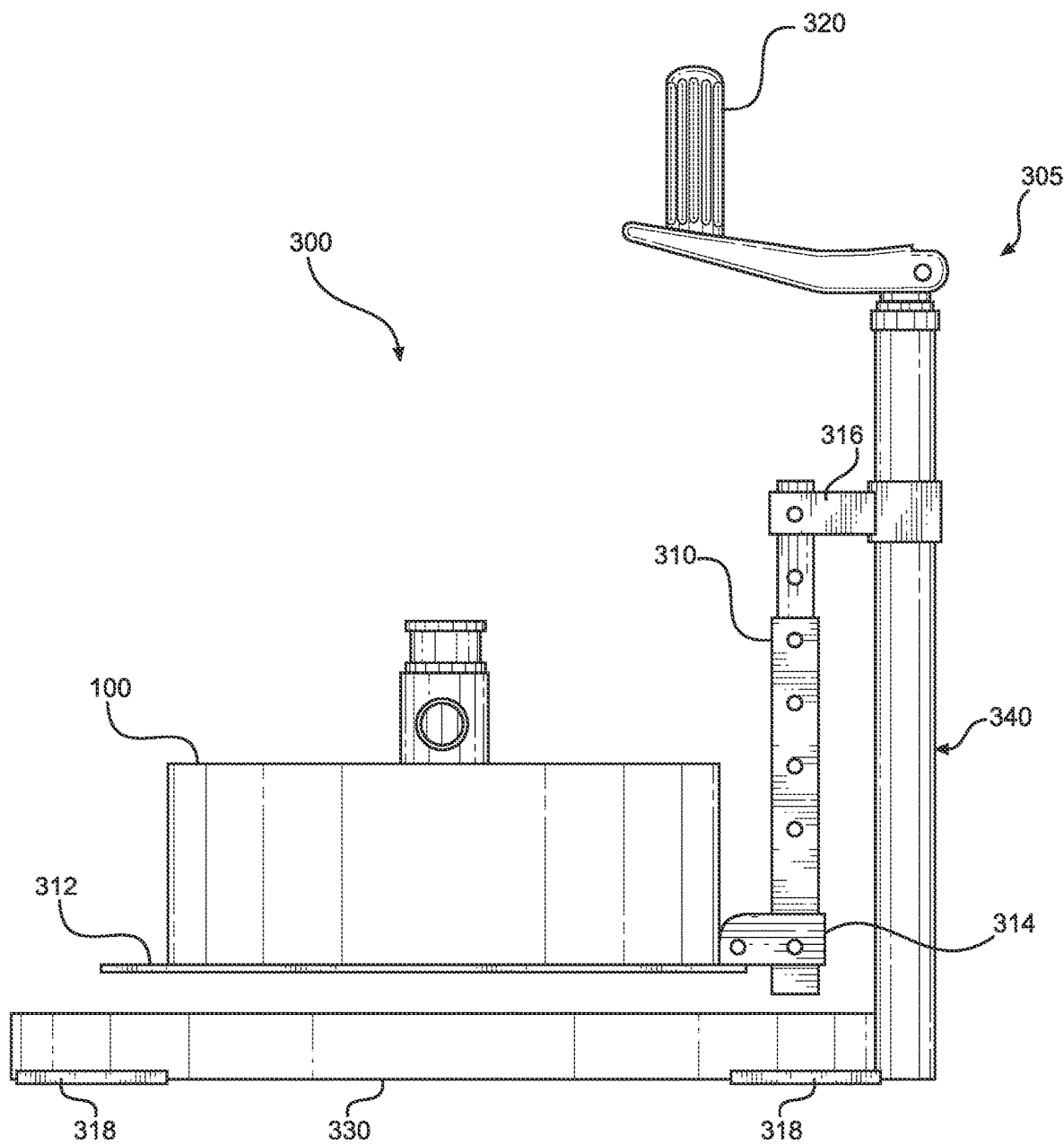
FIG. 4A illustrates a side view of another exemplary embodiment of the separation apparatus.

As shown in sideview FIG. 4A, a statically deployed assembly 300 is provided. In this embodiment, a manually operated, mechanical height adjustment mechanism 305 is coupled to and supports skimmer vessel 100. Height adjustment mechanism 305 includes a platform 312 for supporting vessel 100. Platform 312 is attached to a vertical member 310 of mechanism 305 and extends upward from a base plate 330 that serves as weighing or anchoring plate to the ground or floor of the area the assembly is deployed.

Vertical member 310 is mechanically coupled to the (ratcheting or gear type) jack 340, through an upper connector 316 and a lower connector 314. Vertical member 310 is in turn fixedly attached to base plate 330. When the ratcheting jack 340 is actuated by rotation of handle 320 a gear member (not shown) within vertical member 310, raises or lowers the platform 312 that supports skimmer vessel 100. Note that vessel 100 may be fixedly attached to platform 312. Vertical member 310 may be cylindrical, or a box shaped vertical pipe element as, for example, a ratcheting jack with stand where the height of platform 312 is adjusted manually via rotating or pump type handle 320 (rotating type shown). Of course, the height adjustment can also be effectuated using any other mechanical mechanism that lifts or lowers assembly 316, 310 and 314 relative to base plate 330 thereby raising or lowering the platform 312.

Figure 4B:
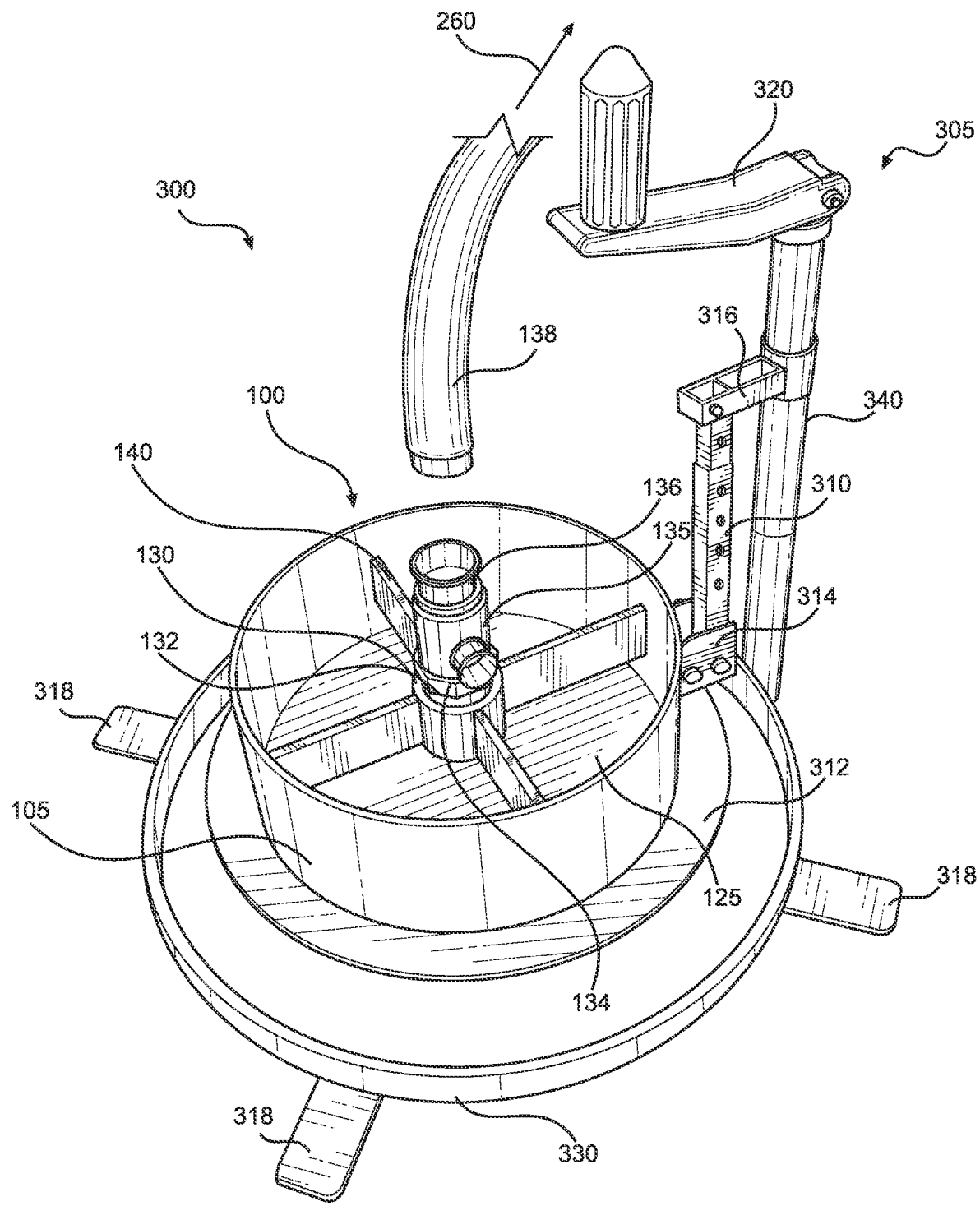
FIG. 4B illustrates a perspective view of the exemplary separation apparatus of FIG. 4A.

FIG. 4B shows in top view a height adjustment mechanism 305 in a jack stand type embodiment. In other embodiments, mechanism 305 may include, for example, a motor, or pneumatic or hydraulically powered cylinder that is manually operated or by an electric pump. For example, handle 320 rather than rotate may pump up and down manually to raise platform 312. In yet other embodiments, a hydraulic pump may be located proximal to the system (i.e., within the firewall), or away from the system (i.e., outside the firewall) via a flexible conduit for air or hydraulic fluid and a tethered or fixed controller used to command the hydraulic or pneumatic pump by an operator.

In the exemplary embodiment of FIGS. 4A and 4B, height mechanism 305 of skimmer assembly 300 includes a fixed or detachable base plate member 330 that may be equipped with footings 318, and that may be seated or permanently anchored to the ground or floor of a containment region such as the bottom of a firewall. Alternatively, base plate 330 may not be affixed permanently to a floor thus making assembly 300 portable and mobile. In this deployment approach, base plate 330 serves as a weighing or stabilizing member allowing assembly 300 to be readily re-positioning as needed. Base plate 330 is also preferably of sufficient mass itself or may accommodate add-on weights to prevent floatation of the assembly 300 supporting skimmer vessel 100.

Figure 5:
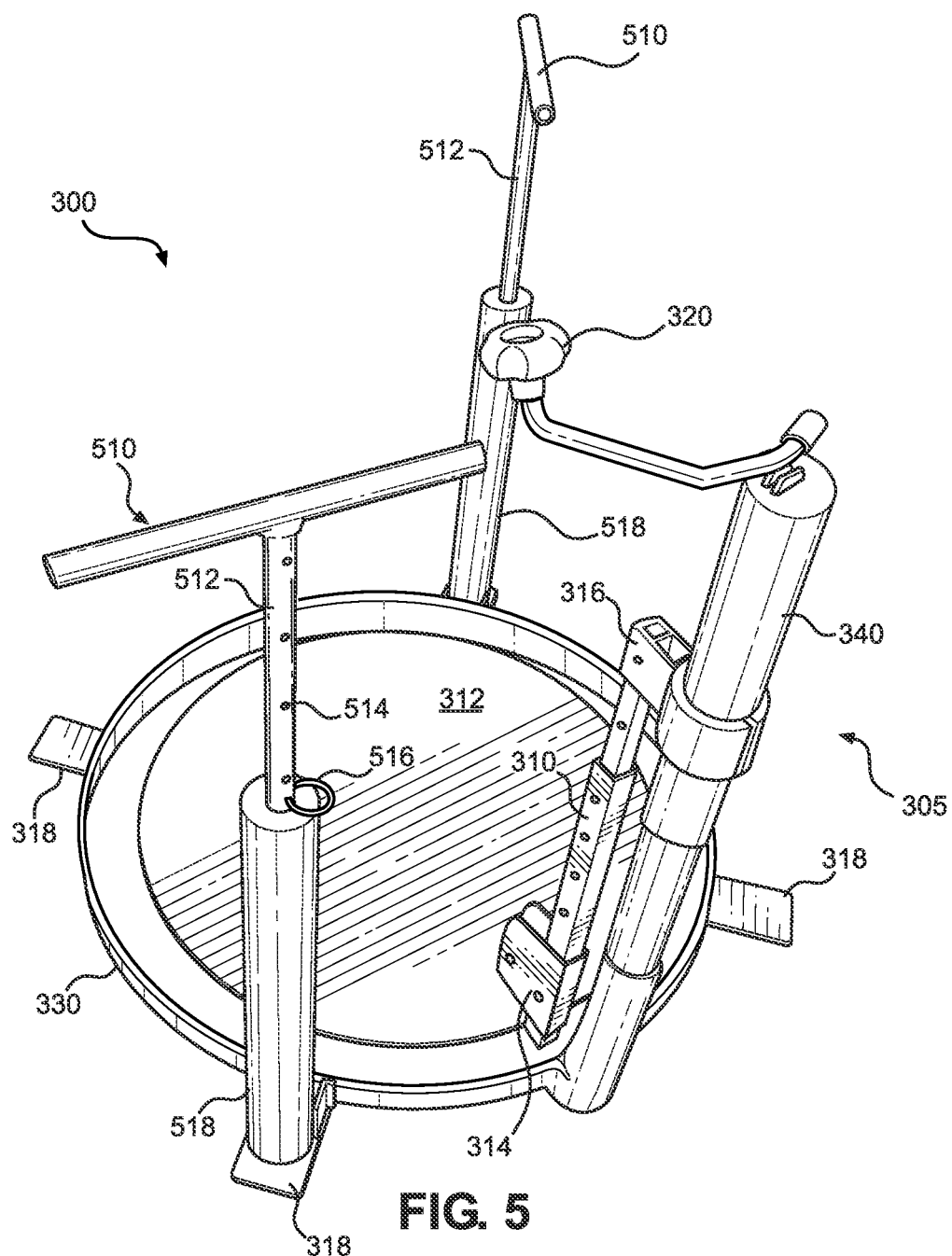
FIG. 5 illustrates an exemplary embodiment of a separation apparatus that includes exemplary anchoring members.

In yet another embodiment of a height adjustable skimmer assembly 300 as depicted in FIG. 5, a height adjustable skimmer assembly 300 may be more stably deployed on an uneven floor or surface as well as anchored to avoid floatation of the assembly. In comparison to FIGS. 4A and 4B, in this embodiment, the skimmer assembly 300 may include one or more (two are shown) anchoring members 510. As shown, each anchor member has an exterior body 518 fixedly attached to base 330 with a footer 318. Thus, for example in an earthen containment region (e.g., 340 of FIG. 3) plungers 512 may be driven downward into the surface to anchor assembly 300 and avoid floatation and instability. In certain embodiments, plungers 512 may be comprised of auger shaped rods (cylinders are shown). As indicated, adjustment holes 514 may be provided so that placing rings 516 in these holes lock the position of the plungers 512 within exterior bodies 518. Similarly, individual plungers 514 may be driven to different depths to provide a leveling of the skimmer assembly 300.

Unlike the manually deployed skimmer vessel 100 (as discussed above and see e.g., FIGS. 1A and B), skimmer assembly 300 is placed in the containment area, such as a firewall area, and the assembly may remain therein in a static position. The height of skimmer vessel 100 is then adjusted by changing the height of platform member 312 of height adjustment mechanism 305. If the less dense layer 230 is unchanging, then the height of skimmer vessel 100 generally needs no further adjustment once initially having been set until all or substantially all of the less dense layer 230 has been removed. If both layers are changing dynamically, i.e., the less 230 and more 240 dense layers are being added to due to an ongoing spill, then platform 312 may be adjusted accordingly.

Figure 6:
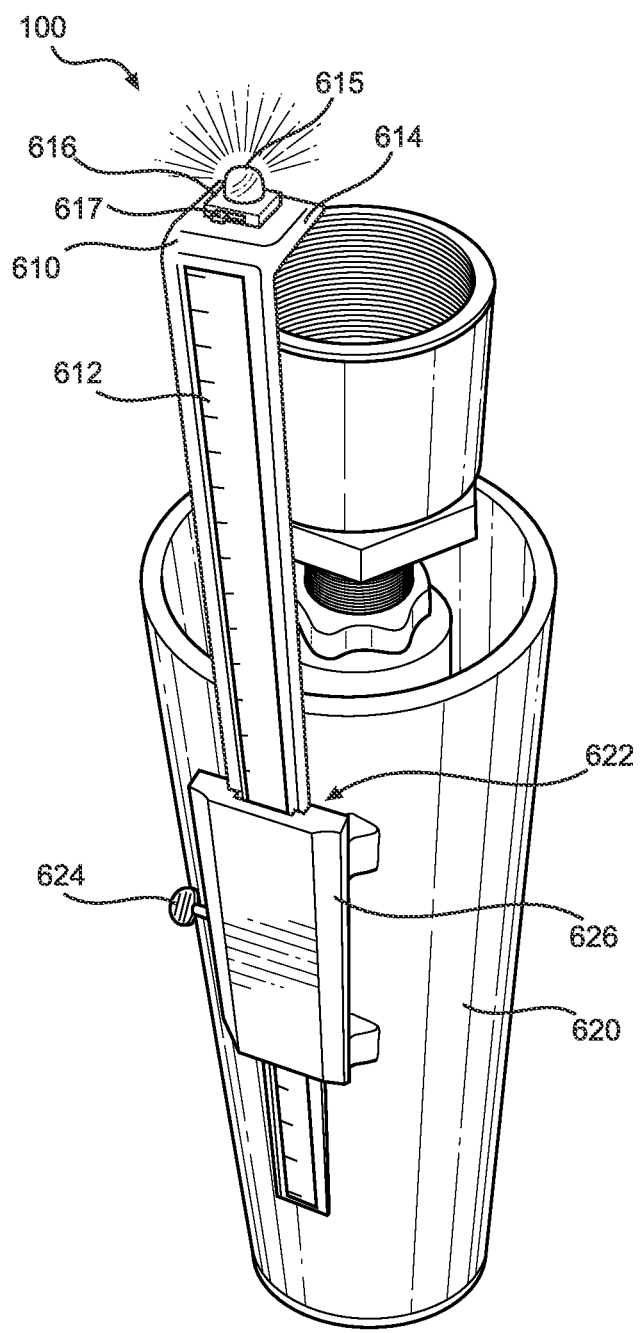
FIG. 6 illustrates another exemplary embodiment of a separation apparatus that includes a depth measurement indicator.

Returning to the portable skimmer vessel 100 that is manually deployed, and position controlled (as shown in FIGS. 1A and 1B), FIG. 6 illustrates an embodiment of a skimmer vessel 100 equipped with a visual depth indicator 610, in the form of a vertical strip with measurement graduations 612. (Note that in the example shown in FIG. 6, skimmer vessel 100 main body 105 is a smaller diameter as compared to that shown in FIGS. 1A and 1B.) In this example, vertical strip of depth indicator 610 slides within slotted body 622 which is affixed to the outer surface of main body 105 and its vertical position set with a clamp, loaded spring, or set screw 624 (shown). The upper end of depth indicator 610 may include a tab 614 to indicate the vertical position to maintain the skimmer vessel relative to the air fluid interface 220 of the lower density fluid 230 (which lies atop the higher density fluid 240, see FIG. 2). Tab 614 as shown in FIG. 6 may also be affixed with a reflector, LED or other device to increase its visibility, particularly within a darkened tank. For example, in the exemplary embodiment shown in shown in FIG. 6, a LED 615 with a battery housing 616 with power switch 617 is affixed to tab 614. In this manner, after a measurement of the height (or depth) of the less dense layer thickness, the visual depth indicator 610 may assist in the placement of the skimmer at a specific desired depth in a tank.

Additionally, in yet other embodiments of the portable skimmer vessel 100 as illustrated in FIGS. 1A and 1B, a floatation member may be included to stabilize skimmer vessel 100. As shown in exemplary depictions of FIGS. 7A and 7B, a floatation device 760 in the form of e.g., one or more floatable arms or bodies such as bulbs, balls, or a hollow toroid (exemplified collectively by 762) and may be coupled to skimmer vessel 100 to provide for improved control and stability of the device during operation. Floatation device 760 and/or skimmer vessel 100 may be further coupled with weights (not shown) to aid in height adjustment and stability.

Figure 7A:
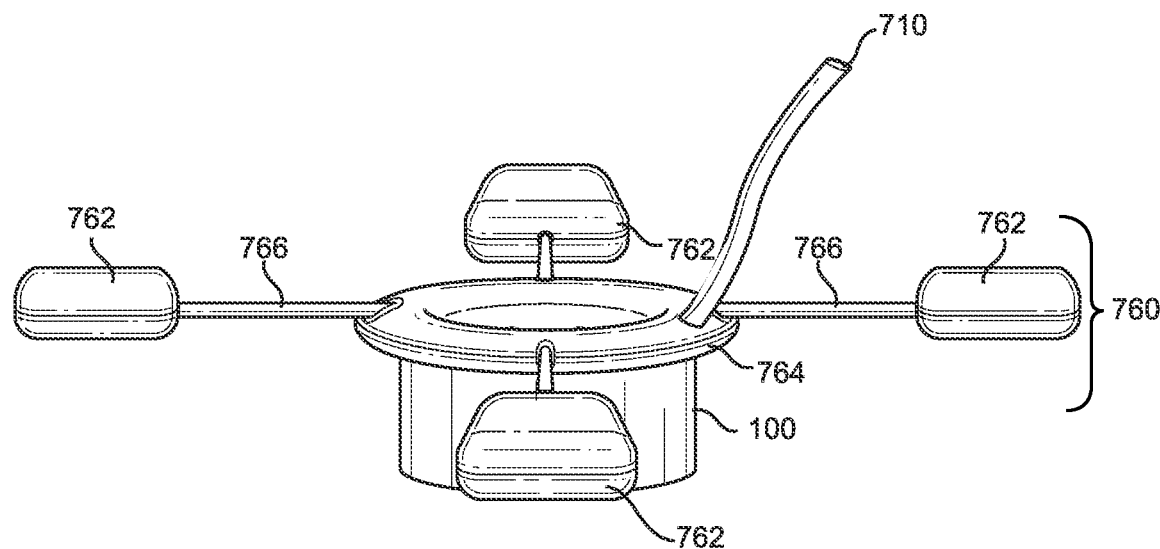
FIG. 7A illustrates an exemplary embodiment of a separation apparatus having an inflatable float feature.
Figure 7B:
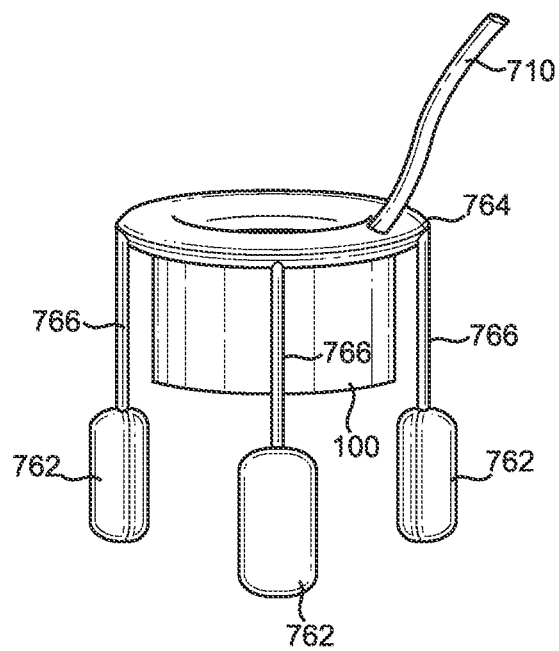
FIG. 7B illustrates the exemplary separation apparatus of FIG. 7A with the inflatable floats in un-inflated state.

The floatable device(s) 760 may be in the form of hollow gas filled shells or solid or semi-solid low-density material such as Styrofoam or inflatable bags or bladders. In certain embodiments of gas filled floatation arms, at least a portion of the arms are inflatable, and the degree of gas filling may be variable to adjust the degree of floatation which may be needed depending on the size and consequent fluid-filled weight of the skimmer vessel 100. In this manner, as shown in FIG. 7A, an inflation hose 710 supplies air (or another gas) to a distributor 764 that is in fluid communication with and directs gas to each of the floats 762 via conduits 766, up to a predetermined pressure. Once pressurized, the inflated floats 762 distributed around the vessel 100 lifts the vessel to the desired height for operative use. By controlling the degree of inflation, the relative floatation height of the vessel 100 can be controlled. FIG. 7B shows the apparatus before gas is supplied when the conduits (rods or hoses) 766 are collapsed downward and the floats 762 are likewise not buoyant and collapsed.

Figure 7C:
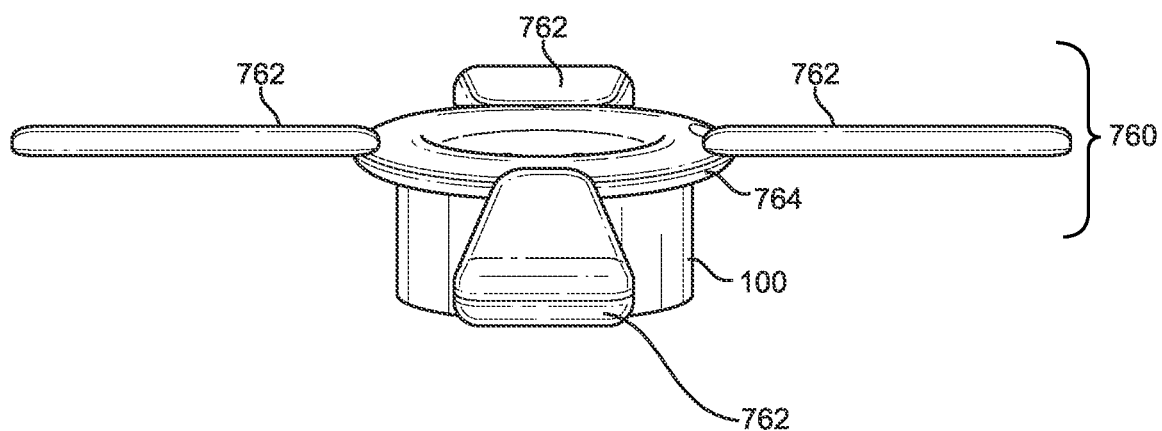
FIG. 7C illustrates the exemplary separation apparatus of FIG. 7A with the inflatable float arms inflatable along their entire length to further aid in buoyance and guiding of material into the vessel.

In another embodiment, as shown in FIG. 7C, floatable devices 762 may extend longitudinally without conduits 766, thus the entire length may be inflatable (or hollow gas filled shells or solid or semi-solid low-density material such as Styrofoam etc.). These arms thus act as floatation aids, but also as guides that prevent the less dense fluid from floating past the skimmer vessel 100. The arms thus act to guide the less dense fluid 230 that would otherwise float too far away to be sucked into 100 and allow the device more time to pull the lighter fluid towards and into the vessel 100.

Figure 7D:
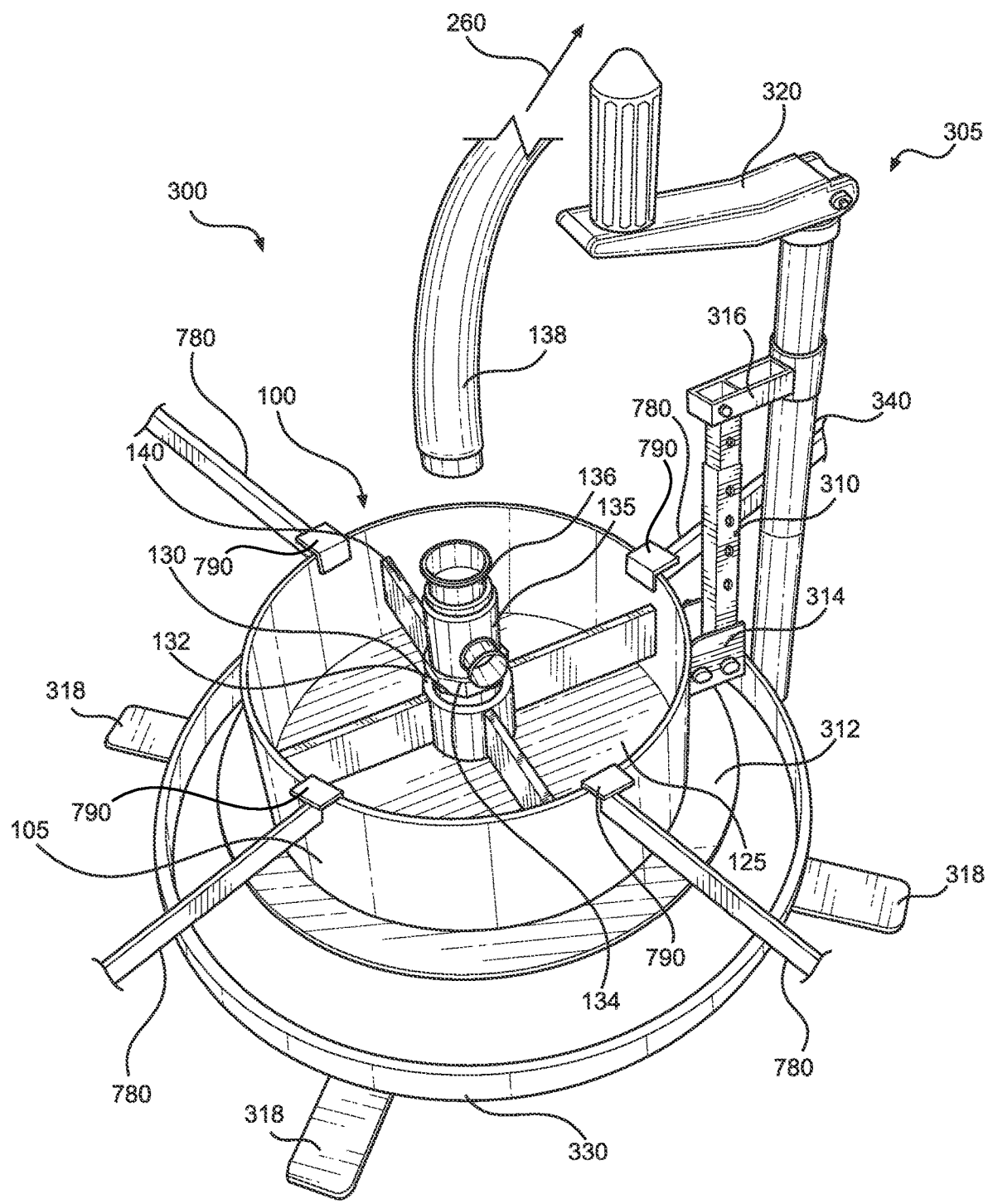
FIG. 7D illustrates an exemplary separation apparatus with rigid longitudinal non-inflatable guide arms attached.

In yet another embodiment, as shown in FIG. 7D, one or more longitudinal guide arms 780 that are not inflatable or floatable may be attached to vessel 100 and extend radially outward. These guide arms, similar to the full-length float arms 762 of FIG. 7C discussed above, serve to assist in directing the less dense layer into vessel 100. The embodiment shown in FIG. 7D depicts the stationary skimmer assembly as shown in exemplary FIGS. 4A and 4B. Such rigid, non-floatable guide arms 780 are also applicable to the portable, manually deployed skimmer 100 as shown in e.g., FIG. 1A and FIG. 6 as well. In the manually deployed application, guide arms 780 may replace or supplement floatable devices 760 discussed above.

Returning to FIG. 7D, typical embodiments of guide arms 780 are comprised of one or more (four are shown) rigid vertical slats of nominally a few to several inches in height and may be typically constructed of metal or composite material. Guide arms 780 are attachable near an uppermost portion top of vessel 100 main body 105 with a connector 790 which may be clip type fitting as shown which thus allow the arms to be detached as needed. Alternatively, guide arms 780 could be attached to a ring or collar and included as part of the connection stack 128 at the center and may further couple, clip to or rest atop top of main body 105.

Figure 8A:
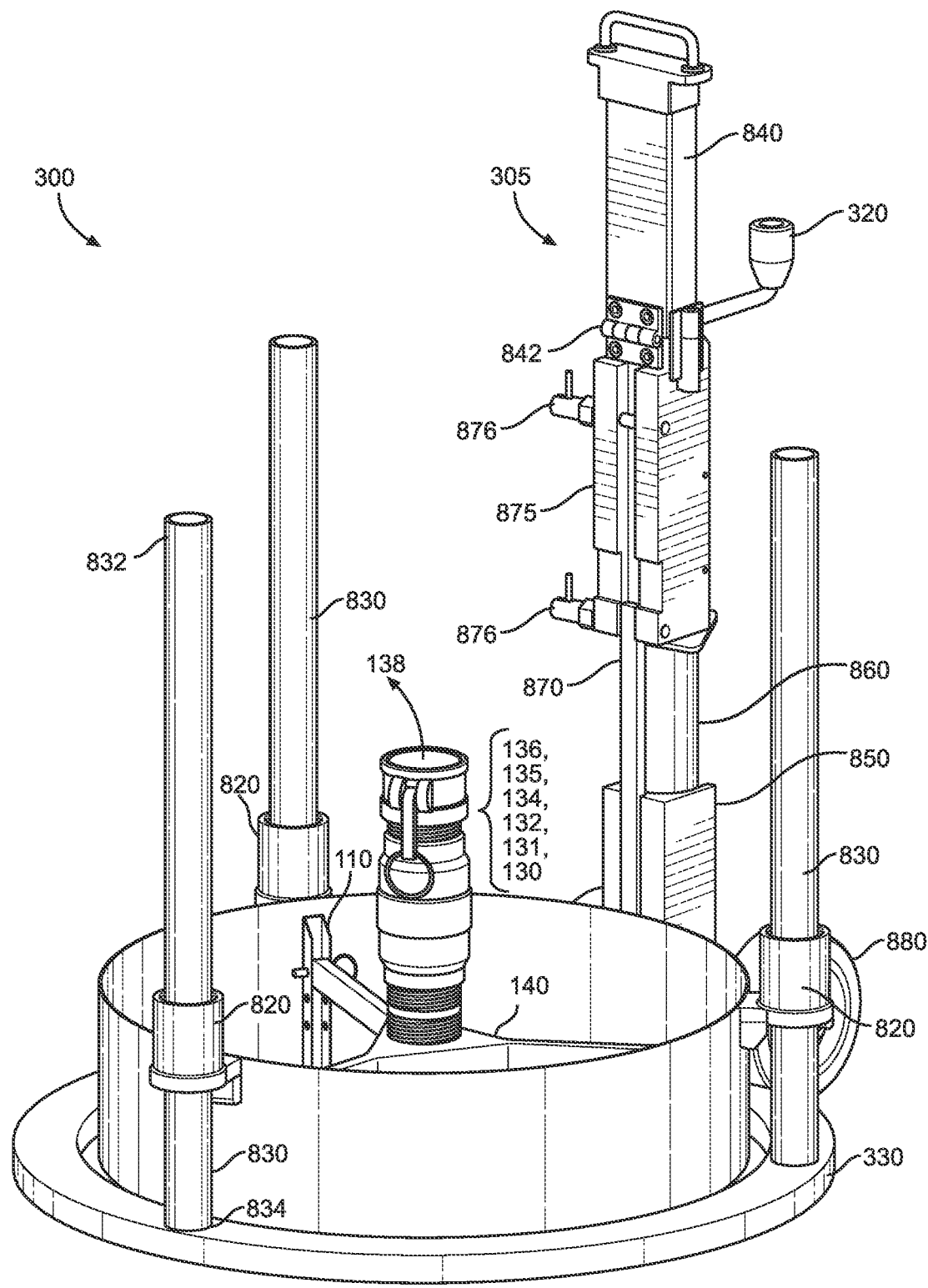
FIG. 8A illustrates another exemplary embodiment of a separation apparatus with an alternative height adjustment assembly.

Another preferred embodiment of skimmer vessel assembly 300 is shown in FIG. 8A. In this embodiment, a manually operated, mechanical height adjustment assembly 305 is coupled to skimmer vessel 100. However, in this embodiment, skimmer vessel 100 includes a plurality (three are shown) of hollow collars 820 coupled to the exterior of the skimmer vessel main body 105. Each collar 820 has a hollow interior that receives and slidably engages a guide cylinder 830 with an upper end 832 and a lower end 834 wherein the lower end may rest upon base plate member 330. In this embodiment, base plate 330 is ring shaped with an interior diameter greater than the outside diameter of skimmer vessel 100 main body 105. In this manner skimmer vessel 100 is supported by collars 820 engaged with guide cylinders 830 and is raised and lower via sliding vertically along the guide cylinders 830. Collars 820 may include bearing races or cassette type bearings to aid movement.

Figure 8B:
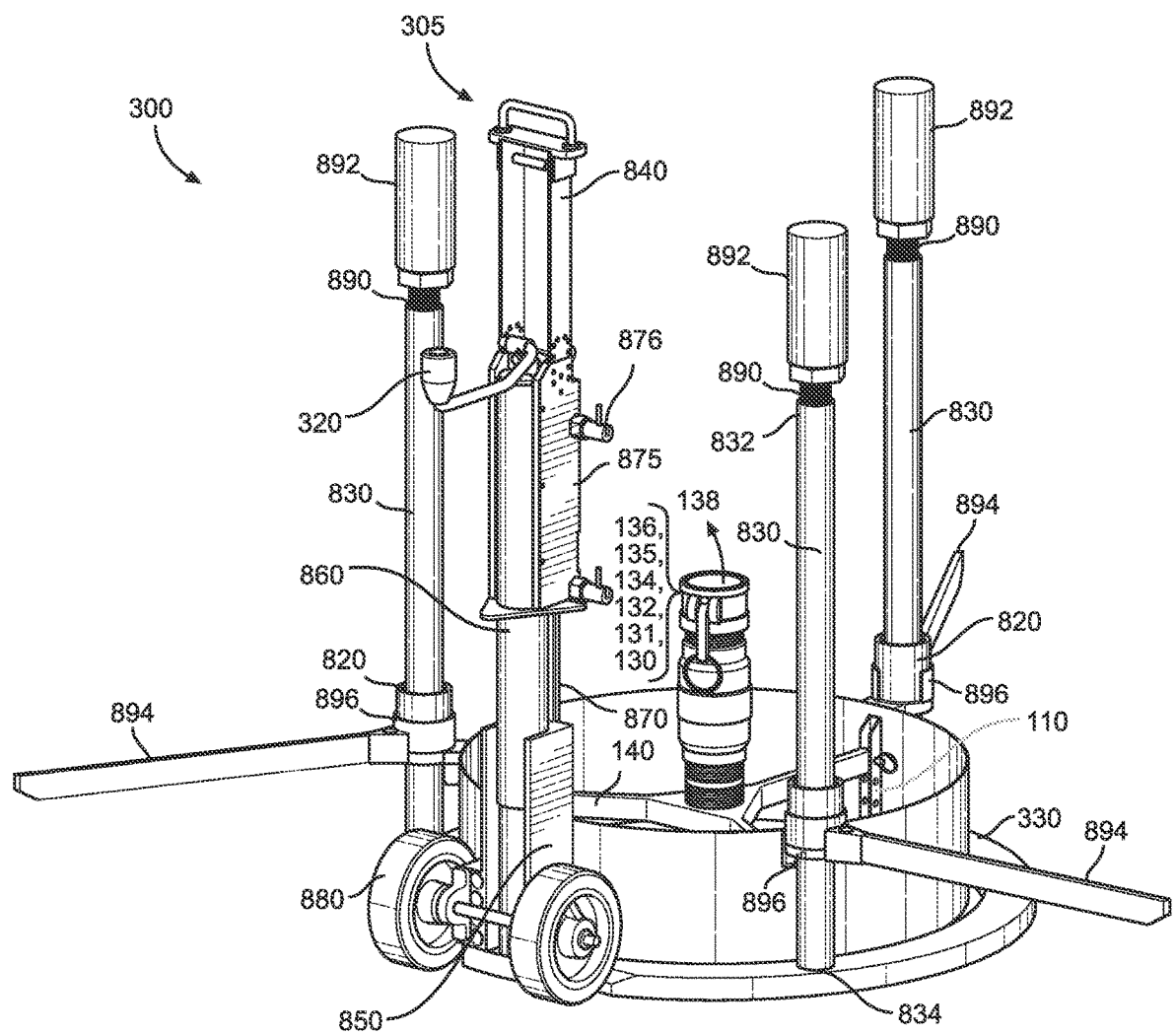
FIG. 8B illustrates the embodiment of a separation apparatus of FIG. 8A with fluid guide arms and anchoring rods attached.

In the embodiment of FIGS. 8A and 8B, base plate 330 includes a receptacle 850 affixed to one end which is configured to receive a lift shaft member 860 of the height adjustment assembly 305 as well as optional wheels or wheel assembly 880. Skimmer vessel 100 includes a vertical support rail member 870 affixed to main body 105 that is fastened (preferably with a quick release or cotter pin type connection) to the movable vertical member 875 of height adjustment assembly 305.

Once lift shaft member 860 is inserted into the receptacle 850 of base plate 330 and vertical support rail 870 is affixed to the movable vertical member 875 of the height adjustment assembly 305, the skimmer assembly 300 is ready to be deployed. In this example, the upper end of height adjustment assembly further includes a collapsible handle 840 which as shown may fold at hinged or pivot point 842 which allows for the entire assembly 300 to be manually tilted similar to a dolly and readily moved about via wheels 880. Once deployed, handle 840 is folded or collapsed thus making actuating handle 320 accessible to the user. A rotating type actuating handle 320 is shown but may also be comprised of a pump type handle or other types to be discussed below.

Skimmer vessel assembly's 100 vertical position may be adjusted by manually pulling up or down on the stack assembly (as shown in exemplary FIGS. 8A and 8B as 130, 131, 132, 134, 135 and 136) thus slidably raising or lowering the vessel along guide cylinders 830 and locking its vertical position using a lock pin 876. In preferred embodiments, lock pins 876 are spring loaded pins which affix and release vertical support rail 870 from movable vertical member 875 thereby locking and alternatively releasing skimmer vessel 100 in order to adjust its vertical height manually.

Alternatively, (or in addition to manual adjustments) vertical positioning of skimmer vessel 100 may be affected by mechanical actuation. As shown in FIG. 8A, movable vertical member 875 is mechanically coupled to lift support member 860 which may be comprised of a ratcheting or gear type actuator, e.g., a pump or crank jack. In this example, when the handle 320 is rotated, lift support member 860 raises or lowers movable vertical member 310 which in turn raises or lowers the skimmer vessel 100 thereby adjusting its vertical position within the fluid to be separated. A manual pump jack type lift support member is shown as the mechanical actuator, however, the height adjustment can also be effectuated using any other lift mechanisms readily contemplated given the present disclosure, for example, other devices that raise or lower movable vertical member 875 thereby raising or lowering the vessel assembly 100 may include a pneumatic or hydraulic cylinder or pump (manual or electrically actuated), or any other manual mechanism or motor that acts upon an extendable member such as a toothed or threaded gear, etc.

The skimmer assembly of FIG. 8A may additionally include longitudinal anchoring rods 890 as shown in exemplary FIG. 8B. Anchoring rods 890 act to stabilize skimmer assembly 300 when deployed and may be inserted into hollow guide cylinders 830. In preferred embodiments, anchoring rods 890 are of a diameter less that the inner diameter of the guide cylinders 830 and are simply inserted coaxially. However anchoring rods 890 may be threadedly inserted within guide cylinders 830 or may be alternatively or additionally attached to a portion thereof the base plate 330, or other portion of the guide cylinders 830 or other portion of skimmer assembly 300. When inserted into or affixed to the guide cylinders 830, their position may be affixed with a set screw or other fastener located on guide cylinders 830. In a preferred embodiment, cylindrical anchoring rods 890 are threaded within guide cylinders 830 such that each anchoring rod's height is adjustable, thus allowing for the open face of skimmer vessel's 100 main body 105 to be made coplanar with the fluid surface when deployed. In this arrangement, anchoring rods 890 extend through holes (not shown) in base plate 330 and be inserted in the ground to further anchor, level and stabilize the assembly 300. Also as shown in FIG. 8B, auxiliary weighted members 892 may be additionally attached to anchoring rods 890 to further weigh down the apparatus 300.

Furthermore, any of the inflatable or rigid fluid guide members discussed above in relation to FIGS. 7A-D may optionally be used in the skimmer assembly 300 embodiment as depicted in FIGS. 8A and 8B to assist in guiding the less dense fluid into the skimmer vessel assembly 100. As shown in FIG. 8B, longitudinal fluid guide arms 894 are attached with snap clips 896 to collars 820 which preferably positions the guide arms just above the main body 105 of skimmer vessel 100.

It is an object of the present technology to preferentially remove low density fluids which have collected on top of higher denser fluids within a tank, reservoir, container, containment region or other contaminated area simply and inexpensively. The invention allows for the removal of substantially all of a lower density fluid volume from the target tank or area without emptying the entire contents of the tank (which would include removing the higher density fluids). Relative to other suction-based removal devices, the instant device and system is superior due to the speed in which the removal occurs and the targeted removal of all or nearly all the low-density fluid.

The use of the inventive technology allows for a less dense liquid to be removed while the less dense liquid is floating on top of a denser liquid in a container. This prevents the less dense fluid from coating the inside surface area of the container (tank, or reservoir) as would occur if the liquid in the container were drained from at or near the bottom of the container. In the case of an oil layer on a water layer, the oil layer on top can be removed and recovered, and the water layer at the bottom can be drained from the container base.

While examples of embodiments of the technology have been presented and described in text and some examples also by way of illustration, it will be appreciated that various changes and modifications may be made in the described technology without departing from the scope of the inventions, which are set forth in and only limited by the scope of the appended claims, as properly interpreted and construed.

What is claimed is:

1. A skimmer assembly for removing a volume of less dense fluid from the top of a denser volume of fluid, the assembly comprising:
   a skimmer vessel configured to be partially immersed in the volume of fluid and contain a portion of the less dense fluid, the skimmer vessel comprising:
   (a) a cylindrical main body with a closed bottom and an open top for receiving the less dense fluid,
   (b) a first fluid conduit located within the main body and a second fluid conduit, wherein the first fluid conduit is configured for fluid communication with the second fluid conduit; and
   a skimmer vessel height adjustment assembly comprising a circular base plate member, a lift shaft member and a movable vertical member, wherein the circular base plate member is configured to receive the lift shaft member, and the lift shaft member is coupled to the movable vertical member wherein said movable vertical member is coupled to the skimmer vessel, and
   wherein actuation of the height adjustment assembly adjusts the skimmer vessel vertical position within the fluid.

2. The skimmer assembly of claim 1, wherein the skimmer vessel further comprises a plurality of support arms each extending from an inner wall of the main body to an outer wall of the first fluid conduit, wherein the plurality of support arms affixes the first conduit's vertical and radial location within the main body.

3. The skimmer assembly of claim 2, wherein the plurality of support arms each has an end in slidable communication with a slot located on an inner wall of the main body.

4. The skimmer assembly of claim 1, wherein the skimmer vessel further comprises a plurality of collars coupled to the exterior of the skimmer vessel main body wherein each collar has a hollow interior configured to slidably engage a guide cylinder wherein each guide cylinder comprises an upper end and a lower end.

5. The skimmer assembly of claim 4 further comprising a weighted member, and wherein the guide cylinder is a hollow pipe configured to receive the weighted member within its upper end.

6. The skimmer assembly of claim 5, wherein the weighted member is affixed to a cylindrical anchor disposed within the guide cylinder.

7. The skimmer assembly of claim 3, wherein the skimmer vessel height adjustment assembly is actuated by a rotatable crank in mechanical communication with the lift shaft member to actuate the movable vertical member.

8. The skimmer assembly of claim 1, wherein the skimmer vessel height adjustment assembly is actuated by an electric motor.

9. The skimmer assembly of claim 1, wherein the skimmer vessel height adjustment assembly includes a hydraulic cylinder actuated by a pump.

10. The skimmer assembly of claim 3, further comprising one or more longitudinal fluid guide arms affixed to the skimmer assembly and extending outwardly from the skimmer vessel and configured to guide the less dense fluid towards the skimmer vessel.

11. The skimmer assembly of claim 1, further comprising wheels coupled to the circular base plate member and a transporting handle to aid in mobility of the assembly.

12. The skimmer assembly of claim 1, further comprising one or more longitudinal anchoring rods.

* * * * *